US012763885B2

(12) United States Patent
Doss

(10) Patent No.: US 12,763,885 B2
(45) Date of Patent: Oct. 13, 2026

(54) LOW-LATENCY WIRELESS AUDIO SYSTEM

(71) Applicant: Shure Acquisition Holdings, Inc., Niles, IL (US)

(72) Inventor: William Kevin Doss, Bull Valley, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 14 days.

(21) Appl. No.: 18/763,533

(22) Filed: Jul. 3, 2024

(65) Prior Publication Data

US 2025/0023670 A1 Jan. 16, 2025

Related U.S. Application Data

(60) Provisional application No. 63/526,859, filed on Jul. 14, 2023.

(51) Int. Cl.

| | |
|---|---|
| ***H04L 1/1867*** | (2023.01) |
| ***H04L 1/08*** | (2006.01) |
| ***H04L 1/1607*** | (2023.01) |
| ***H04L 1/1829*** | (2023.01) |

(52) U.S. Cl.

CPC ................ *H04L 1/189* (2013.01); *H04L 1/08* (2013.01); *H04L 1/1657* (2013.01); *H04L 1/1854* (2013.01)

(58) Field of Classification Search

CPC ......... H04L 1/189; H04L 1/08; H04L 1/1657; H04L 1/1614; H04L 1/1887; H04L 1/1854

See application file for complete search history.

(56) References Cited

U.S. PATENT DOCUMENTS

| | | | | |
|---|---|---|---|---|
| 6,449,255 | B1 | 9/2002 | Waclawsky | |
| 12,057,946 | B2 * | 8/2024 | Young | H04L 1/1887 |
| 2007/0169151 | A1 | 7/2007 | Vishloff et al. | |
| 2008/0123660 | A1 | 5/2008 | Sammour et al. | |
| 2010/0046441 | A1 * | 2/2010 | Vermani | H04W 28/06 370/329 |
| 2012/0310395 | A1 | 12/2012 | El-Hoiydi | |
| 2015/0319557 | A1 | 11/2015 | El-Hoiydi | |
| 2019/0007866 | A1 * | 1/2019 | Agarwal | H04L 1/08 |
| 2019/0140783 | A1 * | 5/2019 | Yerramalli | H04L 1/1816 |

(Continued)

OTHER PUBLICATIONS

A. Ahmed, A. Al-Dweik, Y. Iraqi, H. Mukhtar, M. Naeem and E. Hossain, "Hybrid Automatic Repeat Request (HARQ) in Wireless Communications Systems and Standards: A Contemporary Survey," in IEEE Communications Surveys & Tutorials, vol. 23, No. 4, pp. 2711-2752, Fourthquarter 2021 (Year: 2021).*

*Primary Examiner* — Cynthia Britt

(74) *Attorney, Agent, or Firm* — Banner & Witcoff, Ltd.

(57) ABSTRACT

Aspects of the disclosure relate to use of aggregated signal transmission. An aggregated signal may comprise multiple packets, reception of which may be acknowledged via a block acknowledgment. A packet may be repeated in successive aggregated signal transmissions, with a maximum quantity of repetitions being based on a packet class associated with a packet. Repetition of a packet may be based on receiving a negative acknowledgment indicating failed packet reception and/or decoding. A frequency hopping protocol may be used for the successive aggregated signal transmissions.

21 Claims, 6 Drawing Sheets

(56) References Cited

U.S. PATENT DOCUMENTS

| | | | | |
|---|---|---|---|---|
| 2021/0111839 | A1* | 4/2021 | Bhamri | H04L 1/08 |
| 2021/0352488 | A1* | 11/2021 | Khawer | H04W 88/14 |
| 2022/0408202 | A1 | 12/2022 | Oesch et al. | |
| 2023/0040563 | A1* | 2/2023 | Pinheiro | H04W 40/02 |
| 2023/0154478 | A1 | 5/2023 | Lee et al. | |
| 2024/0314630 | A1* | 9/2024 | Baykas | H04L 1/16 |

* cited by examiner

LOW-LATENCY WIRELESS AUDIO SYSTEM

CROSS-REFERENCE TO RELATED APPLICATION

This application claims the benefit of U.S. Provisional Patent Application No. 63/526,859, filed on Jul. 14, 2023, which is fully incorporated herein by reference.

TECHNICAL FIELD

Aspects of the disclosure relate to wireless communication and more specifically to wireless transmission and reception of signals in an audio communication system.

BACKGROUND

Audio codecs may define protocols for digital audio packet generation, conversion of digital audio packets to analog signals, and/or other aspects of audio processing (e.g., encoding, decoding, compression, decompression, etc.). The audio codecs may be used in conjunction with one or more communication protocols for audio data communication. Audio codecs and or communication protocols may specify techniques for improving signal reliability and responding to transmission errors.

SUMMARY

The following summary presents a simplified summary of certain features. The summary is not an extensive overview and is not intended to identify key or critical elements.

A communication device may perform aggregated signal transmission. An aggregated signal may comprise a plurality of packets (e.g., audio packets). A packet that fails to be received and/or processed at a receiving device may be retransmitted, subject to restrictions on a maximum quantity of retransmissions. For example, the communication device may send (e.g., to a receiving device) a first aggregated signal comprising at least a first packet and a second packet. The receiving device may respond to the first aggregated signal by sending a block acknowledgment. For example, the block acknowledgment may indicate successful reception of the first packet and unsuccessful reception and/or unsuccessful decoding of the second packet. The communication device may send, in one or more second aggregated signals, one or more repetitions of the second packet based on the block acknowledgment indicating unsuccessful reception of the second packet. The communication device may send one or more repetitions of the second packet until a block acknowledgment indicating successful reception of the second audio packet is received. A quantity of repetitions of the second packet may be limited to being less than a threshold that is based on a packet class associated with the packet. The communication device may refrain from sending any repetitions of the first packet based on the block acknowledgment indicating unsuccessful reception of the second packet. The communication device may use frequency hopping to send successive aggregated signals. Aggregating packets, dropping successfully transmitted packets, limiting a quantity of retransmissions for a packet, and the use of frequency hopping as described herein may reduce latency, improve throughput, and/or reduce packet loss in the communication system.

These and other features and advantages are described in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
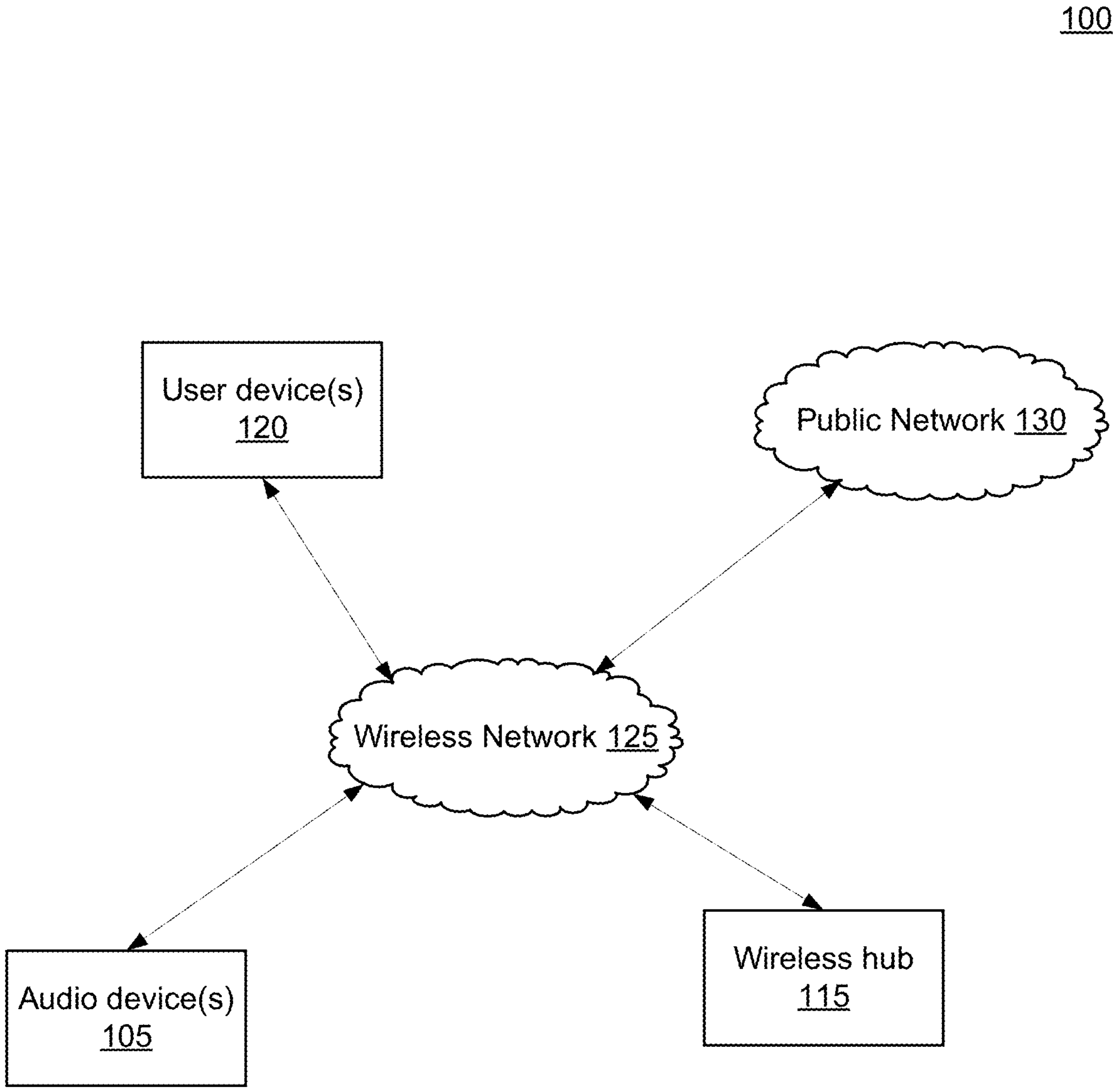
FIG. 1 shows an example communication system.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. It is noted that various connections between elements are discussed in the following description. It is noted that these connections are general and, unless specified otherwise, may be direct or indirect, wired or wireless, and that the specification is not intended to be limiting in this respect.

Transmission of audio data may comprise conversion of analog audio data into digital audio data, packetization of the digital audio data, and transmission of audio packets via a communication channel. Reception and processing of audio packets may comprise demodulation of received signals to retrieve the digital audio data and/or conversion of digital audio into analog signals. A combination of audio codecs and communication protocols may specify the generation, transmission, reception, and processing of audio data.

Protocols associated with audio data transmission may also specify mechanisms to improve communication reliability (e.g., packet repetition). Packet repetition may allow a receiving device to have multiple opportunities to receive a particular audio packet. For example, a receiving device that is unable to receive and/or decode an audio packet as sent in a first time period (e.g., due too poor channel conditions in the first time period), may be able to successfully receive and decode a repetition of the audio packet as sent in a second time period. In an example, the receiving device may send an indication of reception failure and/or decoding failure to the transmitting device, and the transmitting device may send a repetition of the packet based on the indication.

However, in certain scenarios (e.g., high channel noise environments) a receiving device may encounter successive packet reception failures. Continuous retransmission of a same packet may cause backing up of audio data at a transmitting device (e.g., in a buffer of the audio device), interruption of audio playback at the receiving device, loss of audio data at the transmitting device (e.g., due to buffer overflow), etc., which may increase transmission latency and reduce communication reliability.

Various examples herein describe packet repetition with constraints on a maximum quantity of packet retransmissions. A quantity of maximum retransmissions for a particular packet may be based on a class assigned to the packet. For example, an audio packet may be categorized as a vital audio packet or an enhanced audio packet. Vital audio packets may comprise basic audio data required for minimal intelligibility of audio by a listener. Enhanced audio packets may comprise additional audio data (e.g., audio data corresponding to a wider frequency range, higher bitrate, etc.) for improving a quality of the audio for the listener. The vital audio packets generated based on an audio input may be assigned a higher quantity of maximum retransmissions. Enhanced audio packets generated based on the audio input may be assigned a lower quantity of maximum retransmissions.

Additionally, frequency hopping may be used for successive retransmissions of an audio packet to increase a quantity of frequency channels for audio transmission. Frequency hopping may improve a probability of packet reception via at least one frequency channel (e.g., in scenarios where one or more other frequency channels may encounter prolonged poor channel conditions). Further, an unequal error protection scheme may be used for audio transmission in which different bits, as generated by a codec in a codeword, may be assigned different error protection levels. Packet retransmission protocols in conjunction with frequency hopping and unequal error protection scheme as described herein may reduce channel utilization, reduce transmission latency, while improving transmission reliability and throughput.

FIG. 1 shows an example communication system 100. The communication system 100 may comprise one or more audio devices 105, a wireless hub 115, one or more user devices 120, and/or one or more other devices connected via a wireless network 125. The wireless network 125 may facilitate communication of data and/or control information between the various devices connected to the wireless network 125.

One or more devices in the wireless network 125 may also be configured for communication via a public network 130 (e.g., the Internet). Connection to the public network 130 may enable one or more devices, associated with the wireless network 125, to live-stream audio data to remote listeners, receive device configuration information from a server (e.g., software and/or firmware updates), receive audio data (e.g., broadcast from a remote location, from a server, etc.) for playback via the audio device(s) 105, etc. Communication via the wireless network 125 and/or the public network 130 may comprise transmission and/or reception of electrical and/or electromagnetic signals that may comprise data (e.g., audio data, or any other type of data) and/or control information.

The devices in the communication system 100 may transmit/exchange/share information via hardware and/or software interfaces using one or more communication protocols (e.g., proprietary and/or non-proprietary communication protocols). The communication protocols may define/codify operation of one or more layers in an Open Systems Interconnection (OSI) model that enable interconnection between and interoperability of multiple devices, applications, and/or systems forming the communication system 100. For example, devices in connected via the wireless network 125 may use one or more of Bluetooth protocol(s), Zigbee protocol(s), Institution of Electrical and Electronics Engineers (IEEE) 802.11 Wi-Fi protocol(s), $3^{rd}$ Generation Partnership Project (3GPP) cellular protocol(s), local area network (LAN) protocol(s), hypertext transfer protocols (HTTP), and/or any other wireless communication protocol, to send and receive audio and/or control information. At least some devices in the wireless network 125 may (e.g., additionally) use wired communication protocols (e.g., universal serial bus (USB) protocol(s), Ethernet protocol(s), and/or any other wired communication protocol).

In an example, the communication between the devices in the communication system 100 may be via wireless channels that are designated as industrial, scientific, and medical (ISM) bands defined by the International Telecommunication Union (ITU) Radio Regulations (e.g., a 2.4 GHz-2.5 GHz band, a 5.75 GHz-5.875 GHz band, a 24 GHz-24.25 GHz band, and/or a 61 GHz-61.5 GHz band, etc.). Additionally, or alternatively, the communication between the devices in the communication system 100 may be via (e.g., one or more channels within) a very high frequency (VHF) band (e.g., 30 MHz-300 MHz band) and/or via (e.g., one or more channels within) an ultra-high frequency (UHF) band (e.g., 300 MHz-3 GHz).

Audio device(s) 105 may comprise one or more audio input device(s), audio output device(s), and/or audio processing device(s). Audio device(s) 105 may comprise one or more of: microphone(s), microphone car piece(s), transceiver(s) (e.g., associated with a musical instrument), speaker(s), wireless headset(s), audio receiver device(s) (e.g., with an output interface such as an XLR connector, USB connector, 3.5 mm connector, etc.), audio mixer(s), and/or any other type of device capable of generating and/or processing audio packets. The wireless hub 115 may interface and/or consolidate communications between the devices in the wireless network 125. For example, the wireless hub 115 may receive audio packets from audio input device(s) (e.g., microphone (s)). The wireless hub 115 may send (e.g., unicast, broadcast) audio packets to audio output device(s) (e.g., speaker (s), earpieces associated with microphones) and/or audio processing device(s) (e.g., a sound mixer).

The user device(s) 120 may comprise one or more personal computing device(s) (e.g., desktop computers, laptop computers), mobile computing device(s) (e.g., smartphone (s), tablet(s)), and/or any other device that may provide a user interface (e.g., graphical user interface (GUI) for controlling and monitoring the operation of the communication network. For example, a user device 120 may be used to provide various settings and/or parameters associated with the operation of the audio device(s), the wireless hub 115, and/or any other device in the wireless network 105. For example, a user interface, associated with the user device 120, may be used to select audio device(s) 105 with which the wireless hub 115 may establish communication. In at least some examples, the user device(s) may provide audio input to, and/or receive audio signals from, one or more devices in the wireless network 125.

Figure 2:
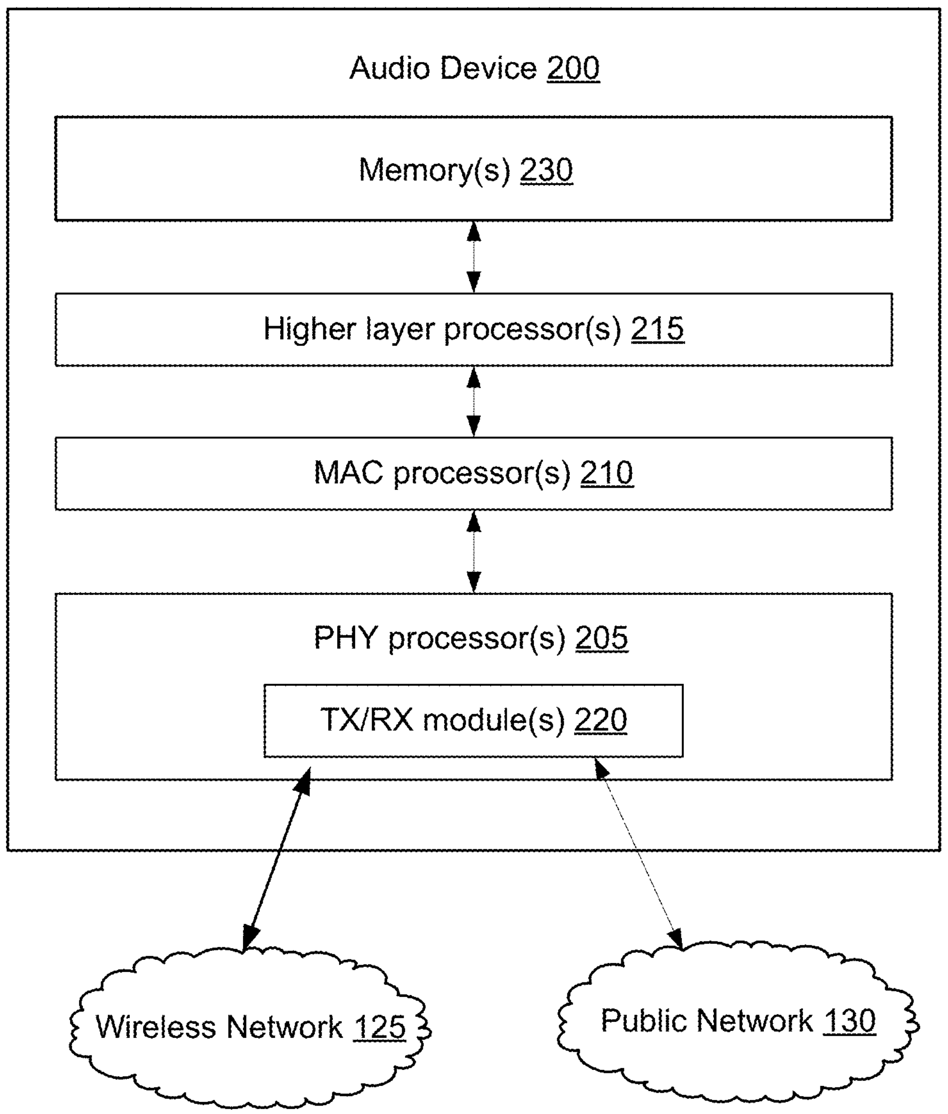
FIG. 2 shows an example architecture of an audio device in an audio communication system.

FIG. 2 shows an example architecture of an audio device 200 in the communication system 100. The audio device 200 may correspond to an audio input device, an audio output device, a wireless hub, an audio processing device, and/or the like. The audio device 200 may comprise one or more of physical layer (PHY) processor(s) 205, medium access control (MAC) processor(s) 210, higher layer processor(s) 215, transmit/receive (TX/RX) module(s) 220, and/or memory 230. The audio device 200 may communicate, via one or more communication protocols, with one or more other devices (e.g., via the wireless network 125 and/or the public network 130). One or more data buses may interconnect the PHY processor(s) 205, the MAC processor(s) 210, the higher layer processor(s) 215, the TX/RX module(s) 220, and/or the memory 230.

The audio device 200 may be implemented using one or more integrated circuits (ICs), software, or a combination thereof, configured to operate as discussed below. The various processors (e.g., one or more of the PHY processor(s) 205, the MAC processor(s) 210, the higher layer processor(s) 215) may be implemented, at least partially, on a single IC or multiple ICs.

Messages transmitted from and/or received by the audio device 200 may be encoded in one or more MAC data units and/or PHY data units. The MAC processor(s) 210 and/or the PHY processor(s) 205 of the audio device 200 may be configured to generate data units, and process received data units, that conform to any suitable wired and/or wireless communication protocol. For example, the MAC processor(s) 210 may be configured to implement MAC layer functions, and the PHY processor(s) 205 may be configured to implement PHY layer functions corresponding to a communication protocol. The MAC processor(s) 210 may, for example, generate MAC data units (e.g., MAC protocol data units (MPDUs)) based on operations performed by the higher layer processor(s) 215, and forward the MAC data units to the PHY processor(s) 205. The PHY processor(s) 205 may, for example, generate PHY data units (e.g., PHY protocol data units (PPDUs)) based on the MAC data units. The generated PHY data units may be transmitted via the TX/RX module(s) 220 to one or more other devices in the wireless network 125 and/or the public network 130. Similarly, the PHY processor(s) 205 may receive PHY data units (e.g., as sent by one or more other devices in the wireless network 125 and/or the public network 130) via the TX/RX module(s) 220, extract MAC data units encapsulated within the PHY data units, and forward the extracted MAC data units to the MAC processor(s) 210. The MAC processor(s) 210 may then process the MAC data units (e.g., as forwarded by the PHY processor(s) 205) and forward the processed MAC data units to the higher layer processor(s) 215 for additional processing. In an example, the PHY data units and/or the MAC data units may correspond to audio packets transmitted via the wireless network 125.

The higher layer processor(s) 215 may implement one or more other layers of the OSI model (e.g., network layer, transport layer, session layer, presentation layer, and/or application layer) representing the operations of the audio device 200. The higher layer processor(s) 215 may process data units for transmission via the MAC processor(s) 210 and the PHY processor(s) 205, and/or process data units as received via the PHY processor(s) 205 and the MAC processor(s) 210.

The memory 230 may comprise any memory such as a random-access memory (RAM), a read-only memory (ROM), a flash memory, or any other electronically readable memory, or the like. The processors (e.g., one or more of the PHY processor(s) 205, the MAC processor(s) 210, the higher layer processor(s) 215), the TX/RX module(s) 220, and/or other component/modules of the audio device 200 may be configured to execute machine readable instructions stored in the memory 230 to perform the various operations described herein. The TX/RX module(s) 220 may comprise components (mixers, amplifiers, drivers, antennas, etc.) for wireless transmission and/or reception of signals (e.g., audio packets, control information) via the wireless network 125 and/or for communication (e.g., wired and/or wireless communication) via the public network 130.

Figure 3:
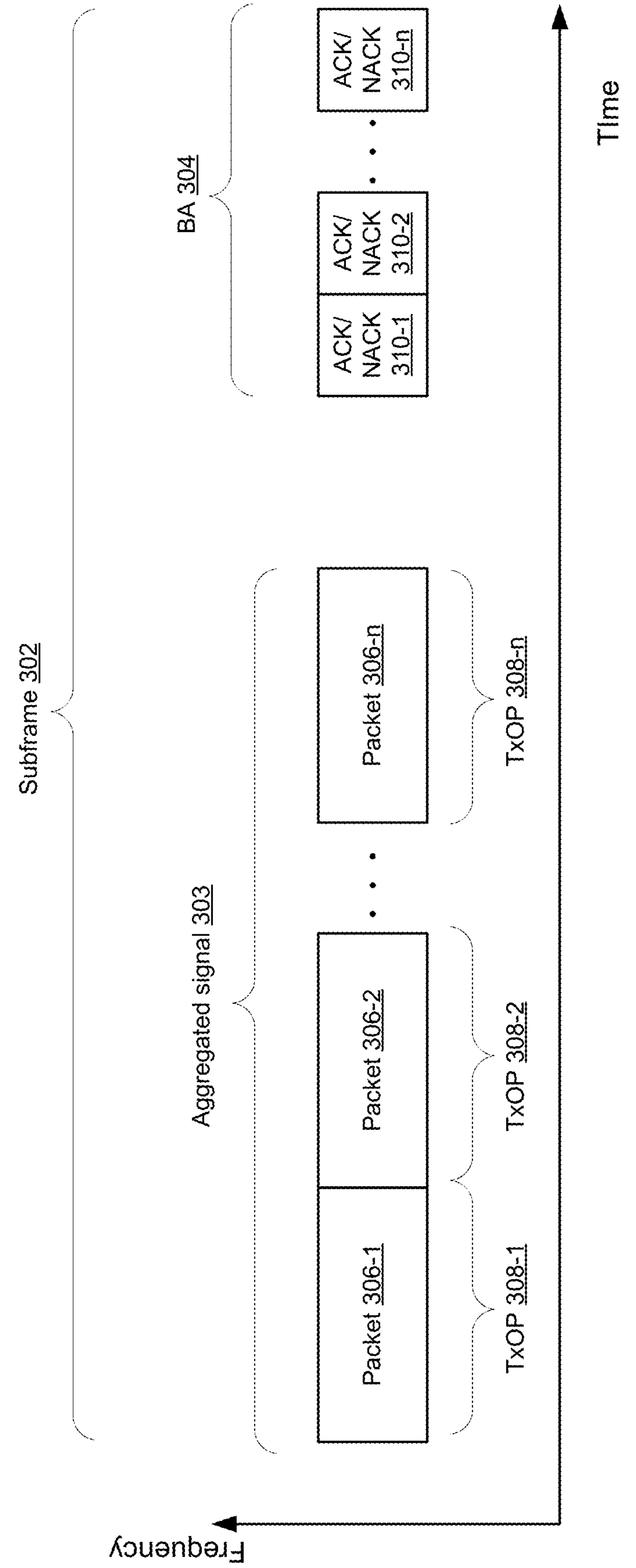
FIG. 3 shows an example aggregated signal transmission and acknowledgment.

FIG. 3 shows an example aggregated signal transmission and acknowledgment. The example aggregated signal transmission and acknowledgment may comprise communication between two or more devices shown in the communication system 100. A subframe 302 may comprise at least an aggregated signal 303 and an associated block acknowledgement (BA) 304. The aggregated signal 303 may be a unicast transmission, a multicast transmission, or a broadcast transmission. The aggregated signal 303 may comprise data (e.g., audio packets), control information, and/or status information. For example, the aggregated signal 303 may be an uplink transmission (e.g., from an audio device 105 to the wireless hub 115), a downlink transmission (e.g., from the wireless hub 115 to an audio device 105), or a sidelink transmission (e.g., from a first audio device to a second audio device). In another example, the aggregated signal 303 may be a transmission to the user device 120 from another device in the communication system 100, or a transmission from the user device 120 to another device in the communication system 100.

The aggregated signal 303 may be an uplink transmission, and the BA 304 may be a downlink transmission from the wireless hub 115 to the audio device 105. The aggregated signal 303 may be a downlink transmission from the wireless hub 115 to an audio device 105 (e.g., an car piece associated with a microphone), and the BA 304 may be an uplink transmission from the audio device 105 to the wireless hub 115. The aggregated signal 303 may be a sidelink transmission from a first audio device to a second audio device, and the BA 304 may be a sidelink transmission from the second audio device to the first audio device.

In at least some examples, the BA 304 may be optional in the subframe 302. For example, a downlink transmission of the aggregated signal 303 from the wireless hub 115 to an audio device 105 need not be acknowledged via a BA, and the subframe 302 may only comprise the aggregated signal 303.

In at least some examples, the subframe 302 may comprise more than one aggregated signal 303. For example, the subframe 302 may comprise multiple aggregated signal-BA pairs. A subframe 302 (e.g., comprising multiple aggregated signals 303) may comprise communications to/from one or more devices. For example, each aggregated signal of the multiple aggregated signal-BA pairs may correspond to communication from the same audio device or from different audio devices. For example, the subframe 302 may comprise two aggregated signal-BA pairs, with a first aggregated signal of the subframe 302 being an uplink transmission from a first audio device (e.g., a first microphone) to the wireless hub 115 and a second aggregated signal of the subframe 302 being an uplink transmission from a second audio device (e.g., a second microphone) to the wireless hub 115. The second aggregated signal may be sent after completion of transmission of the first aggregated signal and via a same frequency channel. In this manner, uplink transmissions from the first audio device and the second audio device may be multiplexed using time division multiplexing (TDM). In other examples, the first aggregated signal and the second aggregated signal may be sent (e.g., simultaneously, or substantially simultaneously) via different subchannels of a same frequency channel (e.g., using frequency division multiplexing (FDM)).

In another example, the subframe 302 may comprise two aggregated signal-BA pairs, with a first aggregated signal of the subframe 302 being an uplink transmission from an audio device 105 (e.g., a first microphone) to the wireless hub 115 and a second aggregated signal of the subframe 302 being an uplink transmission from the same audio device 105 (e.g., the first microphone) to the wireless hub 115. The second aggregated signal may be sent after completion of transmission of the first aggregated signal and via a same frequency channel. In other examples, the first aggregated signal and the second aggregated signal may be sent via different sub-channels of a same frequency channel.

Each aggregated signal of the multiple aggregated signal-BA pairs may correspond to communication to the same audio device or to different audio devices. For example, the subframe 302 may comprise two aggregated signal-BA pairs, with a first aggregated signal of the subframe 302 being a first downlink transmission from the wireless hub 115 to a first audio device 105 (e.g., a first car piece) and a second aggregated signal of the subframe 302 being a second downlink transmission from the wireless hub 115 to a second audio device 105 (e.g., a second car piece). In another example, the subframe 302 may comprise two aggregated signal-BA pairs, with a first aggregated signal of the subframe 302 being a first downlink transmission from the wireless hub 115 to an audio device 105 (e.g., an car piece) and a second aggregated signal of the subframe 302 being a second downlink transmission from the wireless hub 115 to the same audio device 105.

An aggregated signal 303 may comprise one or more transmission opportunities (TxOP) 308. Each TxOP 308 may be used for transmission of a corresponding packet 306. For example, TxOP 308-1 may be used for transmission of a packet 306-1, TxOP 308-2 may be used for transmission of a packet 306-2, TxOP 308-N may be used for transmission of a packet 306-N, etc. A packet 306 may correspond to an audio protocol data unit (PDU) (e.g., audio packet), a control PDU, or a status PDU.

The BA 304 may be used to acknowledge reception of the packets 306 in a corresponding aggregated signal 303. For example, the BA 304 may immediately follow a corresponding aggregated signal 303. If the aggregated signal 303 is an uplink transmission from an audio device 105 (e.g., a microphone) to the wireless hub 115, the BA 304 may be a downlink acknowledgement from the wireless hub 115 to the audio device 105. If the aggregated signal 303 is a downlink transmission from the wireless hub 115 to an audio device 105 (e.g., a speaker), the BA 304 may be an uplink transmission from the audio device 105 to the wireless hub 115.

In an example, the BA 304 may comprise a bitmap. Each bit of the bitmap may indicate whether a corresponding packet 306 was successfully received and decoded. Each bit of the bitmap may be an acknowledgment/negative acknowledgment (ACK/NACK) indicator 310 indicating whether a corresponding packet 306 was successfully received and decoded. For example, ACK/NACK 310-1 may indicate whether the packet 306-1 was successfully received and decoded, ACK/NACK 310-2 may indicate whether the packet 306-2 was successfully received and decoded, ACK/NACK 310-N may indicate whether the packet 306-N was successfully received and decoded, etc. For example, a '0' in the ACK/NACK 310-N may indicate that the packet 306-N was not received or decoded successfully, and a '1' in the ACK/NACK 310-N may indicate that the packet 306-N was received and decoded successfully.

Figure 4:
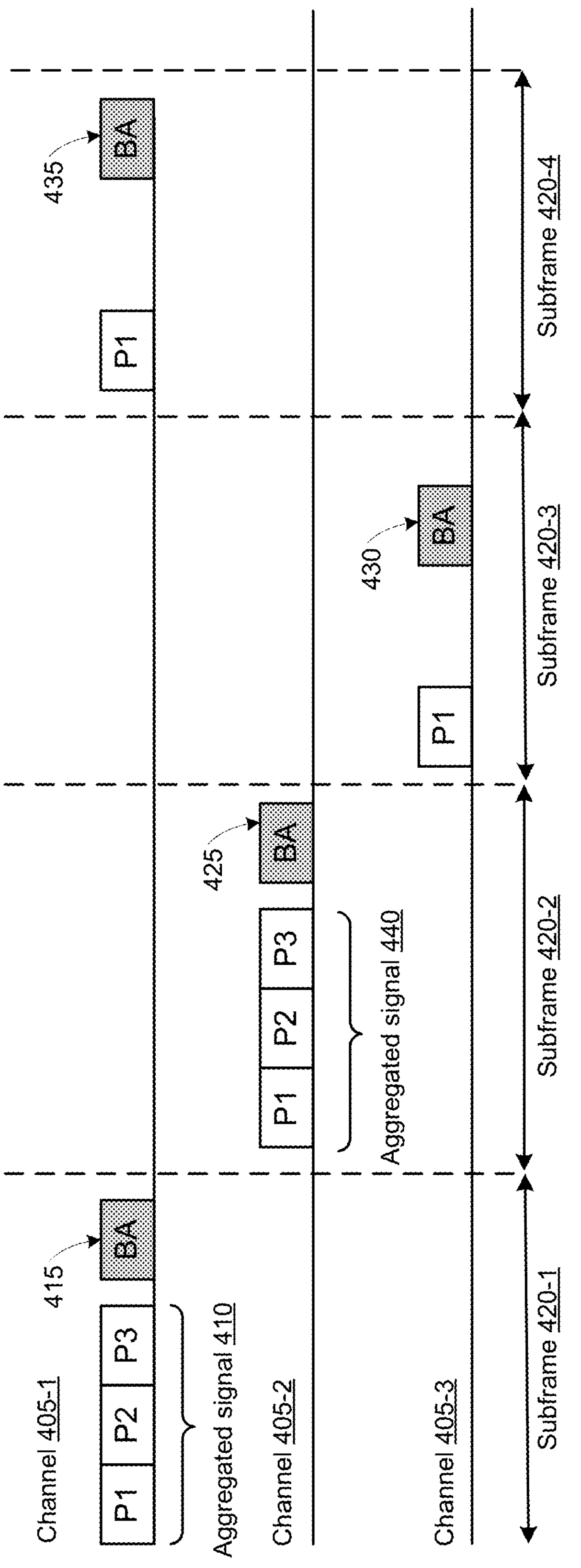
FIG. 4 shows an example aggregated signal transmission via multiple communication channels.

FIG. 4 shows an example communication 400 via multiple communication channels. The example communication 400 may correspond to signal transmission and associated acknowledgment by one or more devices in the communication system 100. For example, the communication 400 may correspond to uplink signal transmission from one or more audio devices 105 to the wireless hub 115, downlink signal transmission from the wireless hub 115 to one or more audio devices 105, sidelink transmissions between two or more audio devices 105, and/or transmissions to/from a user device 120.

The example communication 400 may be via a plurality of channels 405 (e.g., frequency channels). The example communication 400 may use frequency hopping for communication via the plurality of channels 405 (e.g., channels 405-1, 405-2, and 405-3). While FIG. 4 shows three channels 405, in other examples a different quantity of channels may be used for communication.

A transmitting device may send (e.g., transmit), via a first channel 405-1, an aggregated signal 410 to a receiving device. In an example, the transmitting device may be the wireless hub 115 and the receiving device may be an audio device 105 or a user device 120. In an example, the transmitting device may be an audio device 105 and the receiving device may be another audio device 105, the wireless hub 115, or a user device 120. In an example, the transmitting device may be a user device 120 and the receiving device may be the wireless hub 115 or an audio device 105. The aggregated signal 410 may comprise one or more packets (e.g., audio packets, control packets). While FIG. 4 shows three packets (e.g., P1, P2, and P3) in the aggregated signal 410, in other examples, a different quantity of packets may be included in an aggregated signal. The receiving device may send a BA 415 indicating whether the packets, comprising the aggregated signal 410, were successfully received and decoded (e.g., such as described with reference to FIG. 3).

Transmissions between devices may be via a plurality of subframes 420. For example, the aggregated signal 410 and the associated BA 415 may be in a subframe 420-1. The subframe 420-1 may include one or more other aggregated signals and (optionally) associated BA(s). The one or more other aggregated signals may be sent by the same transmitting device of the aggregated signal 410 and/or by one or more other transmitting devices. The plurality of subframes 420 may be used for transmission of one or more repetitions of the packets comprising the aggregated signal 410. A maximum quantity of repetitions of a packet (and/or a maximum quantity of transmissions of the packet) may be based on a packet class associated with a packet.

Each packet, comprising the aggregated signal 410, may be associated with a corresponding packet class (e.g., class 1, class 2, class 3, etc.). Higher packet class(es) (e.g., class 1) may be associated with packets that may provide a minimum acceptable level of communication between devices and/or maintain a connection (e.g., communication link) between devices. Lower packet class(s) (e.g., class 2, class 3, etc.) may be associated with packets that facilitate high quality operation/service and/or optional add-on features in a communication system.

For example, class 1 packets may correspond to audio packets that provide a minimum level of audio fidelity to a listener. Class 1 audio packets may be generated from audio in a narrow frequency range (e.g., 300 Hz-3.5 kHz) and/or may use a low sampling rate. Class 2 audio packets may correspond to audio packets that provide enhanced level of audio fidelity to a listener. Class 2 audio packets may be generated from audio in a moderate frequency range (e.g., 50 Hz-7 kHz) and/or may use a moderate sampling rate. Class 3 audio packets may correspond to audio packets that provide an even more enhanced level of audio fidelity to a listener. Class 3 audio packets may be generated from audio in a wide frequency range (e.g., 20 Hz-15 kHz) and/or may use a high sampling rate. Other quantity of packet classes may be used (e.g., 2, 4, 5, etc.).

Higher packet class(es) may be associated with a higher maximum quantity of repetitions/retransmissions via the plurality of subframes 420. Lower packet class(es) may be associated with a lower maximum quantity of repetitions/retransmissions. With respect to the example communication 400 of FIG. 4, packet P1 and P2 may be class 1 packets, while packet P3 may be a class 2 packet. For example, class 1 packets may be assigned a maximum of three retransmissions, while class 2 packets may be assigned a maximum of one retransmission. However, in other examples, each packet may be assigned a same quantity of retransmissions irrespective of packet class.

The transmitting device may send, to the receiving device, the aggregated signal 410 (e.g., comprising packets P1, P2, and P3) via the subframe 420-1. The receiving device may send, to the transmitting device, the BA 415. The BA 415 may indicate whether each of the packets P1, P2, and P3 were successfully received and decoded. For example, the BA 415 may indicate that packets P1, P2, and P3 were not received or were not decoded successfully. Unsuccessful decoding of a packet may comprise failure of a cyclic redundancy check (CRC) at the receiving device.

Based on reception of the BA 415 (e.g., indicating that packets P1, P2, and P3 were not received and/or were not decoded successfully), the transmitting device may send, in a next subframe 420-2, repetitions of the packets P1, P2, and P3 (e.g., in a second aggregated signal 440). For example, the transmitting device may send the aggregated signal 440 comprising the packets P1, P2, and P3. The receiving device may send, to the transmitting device, the BA 425 indicating that packet P2 was successfully received and decoded, but packets P1 and P3 were not successfully received or decoded.

Based on an indication of a successful reception of packet P2 in the BA 425, the transmitting device may determine to not retransmit the packet P2. As such, even though the packet P2 is a class 1 packet with a maximum of three retransmissions, packet P2 may not be retransmitted based on reception of an acknowledgement indicating successful reception and decoding of the packet P2.

The transmitting device may determine to not retransmit packet P3 based on a maximum number of retransmissions of packet P3 being reached. For example, packet P3 may be assigned a maximum of one retransmission based on the packet P3 being a class 2 packet. Further, the transmitting device may determine to not retransmit packet P3 even though the packet P3 was not successfully received or decoded at the receiving device (e.g., as indicated in the BA 425). Following the retransmission of the packet P3 in the subframe 420-2 and/or based on receiving the BA 425 indicating that packet P3 was not successfully received or decoded, the transmitting device may cease further retransmissions of the packet P3.

The transmitting device may determine that the first retransmission of the packet P1 (e.g., in the subframe 420-2) was not successfully received and/or decoded based on an indication in the BA 425. Packet P1 may be assigned a maximum of three retransmissions based on the packet P1 being a class 1 packet. The transmitting device may determine to retransmit packet P1 (e.g., in a next subframe 420-3 and in a third aggregated signal), for example, based on the determining that the packet P1 was not successfully received and/or decoded and further based on determining that a maximum quantity of retransmissions of packet P1 has not been reached.

Following the first retransmission of the packet P1 in the subframe 420-2 and based on the above considerations, the transmitting device may send a second retransmission of packet P1 in the subframe 420-3 (e.g., after prior transmissions of P1 in the aggregated signal 410 at subframe 420-1 and aggregated signal 440 at subframe 420-2). The receiving device may send, to the transmitting device, the BA 430 indicating that packet P1 was not successfully received and/or decoded. The transmitting device may again determine to retransmit packet P1 (e.g., in a next subframe 420-4 and in a fourth aggregated signal), for example, based on the determining that the packet P1 was not successfully received and/or decoded and further based on determining that a maximum quantity of retransmissions of packet P1 has not been reached.

Following the second retransmission of the packet P1 in the subframe 420-3 and based on the above considerations, the transmitting device may send a third retransmission of packet P1 in the subframe 420-4. The receiving device may send, to the transmitting device, the BA 435 indicating that packet P1 was not successfully received and/or decoded. The transmitting device may determine to not retransmit packet P1 based on a maximum number of retransmissions of packet P1 being reached. For example, the transmitting device may determine that packet P1 is a class 1 packet that has been retransmitted three times (e.g., the maximum quantity of retransmissions for class 1 packets) and accordingly may not retransmit packet P1. A next subframe (e.g., following the subframe 420-4) may comprise a new aggregated signal (e.g., from the transmitted device) with new packets.

While the aggregated signals in subframes 420 as shown in FIG. 4 only include packets that are being retransmitted, in each subframe 420, a corresponding aggregated signal may comprise packet(s) that have not been previously transmitted along with packets that are being retransmitted. For example, the transmitting device, in each subframe 420, may resend packets that have not yet been successfully acknowledged (e.g., via BA) and for which the quantity of retransmissions has not reached assigned limits. The transmitting device may additionally, or alternatively, include, in each subframe 420, new packets that have not been transmitted previously. The total quantity of packets in each subframe 420 may be less than or equal to the maximum quantity of TxOPs in the subframe.

In some examples, the transmitting device, in subsequent subframes, may only resend packets that have not yet been successfully acknowledged (e.g., via BA) and for which the quantity of retransmissions has not reached assigned limits. As shown in FIG. 4, the transmitting device merely sends packet P1 in subframes 420-3 and 420-4, based on BAs indicating unsuccessful reception of packet P1 in corresponding previous subframes. Transmission of only previously transmitted, but unsuccessfully received, packets may reduce channel utilization and/or reduce energy utilization at the transmitting device. For example, the subframes 420-3 and 420-4 are only utilized for retransmissions of packet P1, thereby reducing overall channel utilization by the transmitting device. Further, packets P2 and P3 are not sent in the subframes 420-3 and 420-4, thereby reducing power consumption at the transmitting device.

In some examples, setting a maximum quantity of retransmissions (e.g., based on a packet class) may prevent creation of a backlog of audio packets and/or buffer overflow in a buffer of the transmitting device. A packet that has repeatedly failed in transmissions may be dropped (e.g., after the maximum quantity of retransmissions), and another (e.g., a next packet in the buffer) packet may be transmitted instead. For example, the transmitting device may determine to cease further attempts at retransmitting packet P1 after subframe 420-4. The transmitting device may select a next packet (e.g., from a buffer) for transmission in a subframe following the subframe 420-4. Stopping retransmission attempts for a packet based on excess failed transmissions and selecting a next packet for transmission may prevent buffer overflows at the transmitting device.

In some examples, setting a maximum quantity of retransmissions (e.g., based on a packet class) and/or skipping retransmissions of successfully received packets may help to improve communication throughput. For example, the transmitting device may send other packets in resources that may have otherwise been used for sending retransmissions of a packet. For example, the transmitting device may send other packets via resources that may have been used for retransmission of packets P2 and/or P3 in subframes 420-3 and/or 420-4.

As shown in FIG. 4, transmissions in successive subframes may use a frequency hopping scheme (e.g., use different frequency channels for transmissions in subsequent subframes). For example, the transmitting device may send transmissions via channel 405-1 in subframe 420-1, via channel 405-2 in subframe 420-2, via channel 405-3 in subframe 420-3, and via channel 420-1 in subframe 420-4. Each of channel 405-1, channel 405-2, and channel 405-3 may use a different frequency and/or different range of frequencies. While the example communication 400 of FIG. 4 shows frequency hopping over three channels, in other examples, a different quantity of frequency channels may be used. Frequency hopping may improve communication reliability. For example, if a transmission fails via a specific channel (e.g., due to high interference or noise), the transmitting device may have another opportunity for a retransmission, via a different channel, in a next subframe.

Determination of channels 405 for transmission may be based on determination of received signal strength indicators (RSSIs) for each prospective channel. For example, the transmitting device may periodically (e.g., every 10 ms, or any other measurement interval) determine RSSIs for each channel that is compatible with the transmitting device (e.g., each channel that may be used for communication by the transmission device). The transmitting device may perform the RSSI measurements at a time period during which the prospective channels are not being used for any data transmission. For example, the transmitting device may perform the RSSI measurements at a time period during which the transmitting device is not transmitting and is not expecting to receive any communication. The transmitting device may select the channels (e.g., channels 405) that have the lowest RSSI measurements among the prospective channels. The quantity of channels 405 may be based on a quantity of channels to be used for the frequency hopping scheme.

Periodic measurement of RSSIs may enable dynamic selection of channels with the lowest interference and noise. For example, the transmitting device may determine, based on an RSSI measurement, that a channel being currently used (e.g., channel 405-3) has an RSSI measurement that has exceeded a threshold. The transmitting device may drop the channel from further use (e.g., for at least a time duration) and instead select a different channel with an RSSI measurement that is lower than the threshold. Alternatively, the transmitting device may determine an entirely new set of channels based on the updated RSSI measurements.

A control channel may be used to establish and/or coordinate communications between different devices. For example, the transmitting device may indicate, via a control channel and during an initial handshake procedure with the receiving device, the channels 405 and a hopping sequence to be used for transmissions to the receiving device. The transmitting device may further indicate a portion of a subframe (e.g., quantity and/or locations of time slots in a subframe) to be used for transmissions to the receiving device. Control signal transmission may use an aggregated packet transmission scheme and/or a subframe protocol as described with reference to FIG. 4.

A transmitting device may use an unequal error protection scheme for bits generated by a codec (e.g., that processes audio for transmission). Bits in a codeword, as generated by the codec, may be categorized in accordance with the protection level to be applied to the bits. For example, the bits may be classified as high importance, medium importance, and low importance (and/or any other protection level or category). Bits classified as high importance bits may have the most impact on audio quality at a receiving device. Medium importance bits and low importance bits may enhance the quality of reproduced audio at the receiving device. As long as the receiving device receives at least one copy of the high importance bits, the receiving device may reproduce audio at an acceptable quality.

Bits classified as high importance bits may be assigned the greatest number of retransmission attempts. Bits classified as medium importance bits may be assigned a lower number of retransmission attempts. Bits classified as low importance bits may be assigned a lowest number of retransmission attempts or may not be retransmitted. In an example, bits classified as high importance bits may be transmitted allocated to class 1 packets, bits classified as medium importance bits may be allocated to class 2 packets, and bits classified as low importance bits may be allocated to class 3 packets.

Figure 5:
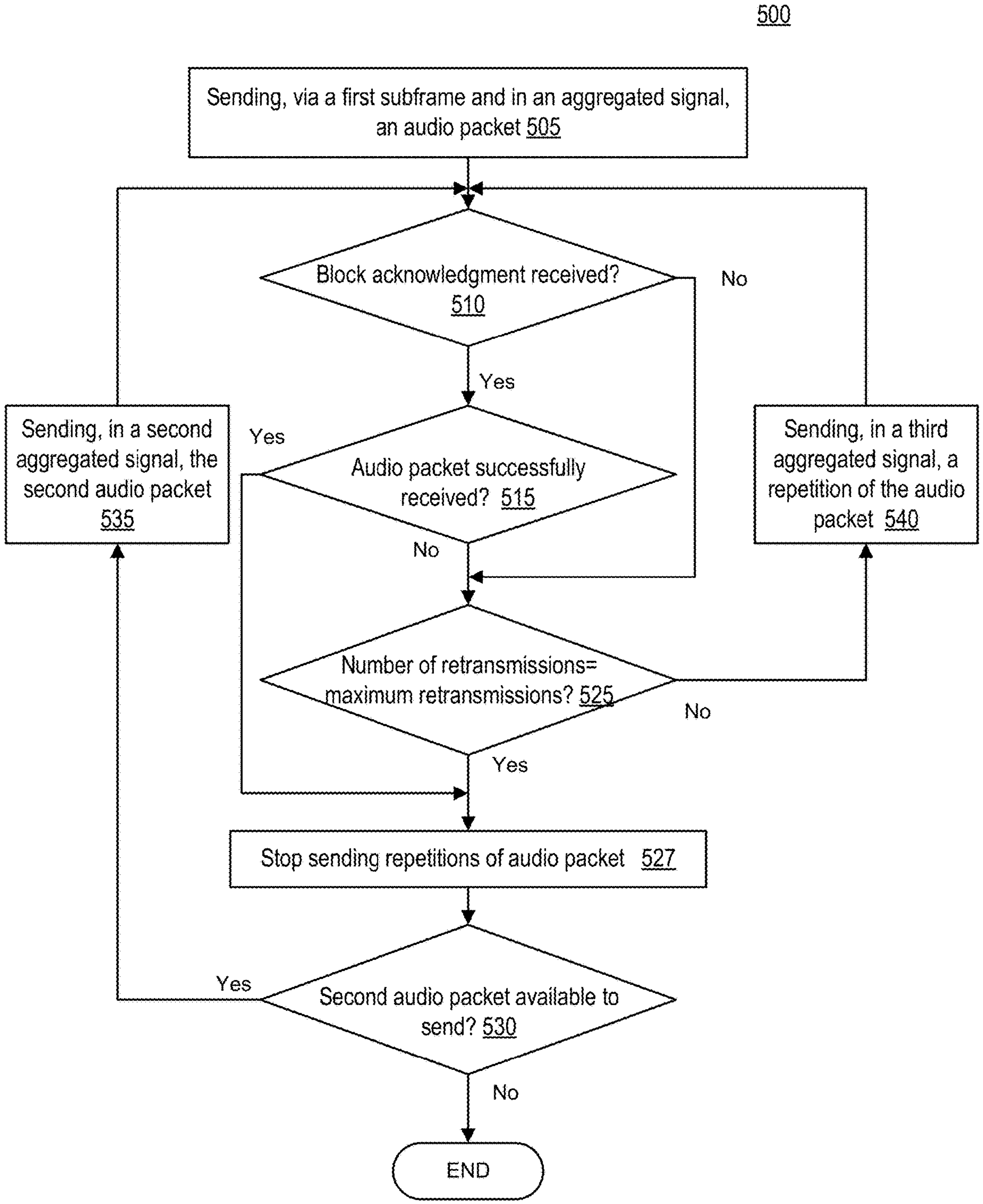
FIG. 5 shows an example method for aggregated signal transmission.

FIG. 5 shows an example method 500 for aggregated signal transmission. The example method may be performed by one or more audio devices 105, the wireless hub 115, and/or the user device 120. While the example method 500 is described with reference to audio packet transmission, in other examples, the method 500 may be used for transmission of control packets, audio and control packets, and/or any other type of data.

At step 505, a transmitting device (e.g., an audio device 105, the wireless hub 115, a user device 120) may send, via a first subframe and in an aggregated signal, an audio packet. The aggregated signal may comprise a plurality of audio packets. For example, the transmitting device may have different queues of packets (e.g., in one or more buffers). For example, the transmitting device may have separate queues for audio packets, application control packets, link layer control packets, etc. The transmitting device may construct the aggregated signal (e.g., prior to the subframe) by selecting packets, with the highest priorities, from the different queues. The number of packets in the aggregated signal may be less than or equal to a maximum number of TxOPs in the first subframe.

At step 510, the transmitting device may determine whether a block acknowledgment has been received from the receiving device. If the transmitting device determines that a block acknowledgment has been received, the transmitting device may analyze (e.g., step 515) the block acknowledgement to determine whether the audio packet has been successfully received/decoded. If the transmitting device determines (e.g., based on the block acknowledgment) that the audio packet has not been successfully received/decoded or if the transmitting device does not receive a block acknowledgment (e.g., within a time interval following the transmission of the aggregated signal comprising the audio packet), the transmitting device may determine (e.g., step 525) whether a maximum number of retransmissions for the audio packet has been reached.

If the transmitting device determines (e.g., at step 525) that the maximum number of retransmissions for the audio packet has been reached or if the transmitting device determines (e.g., at step 515 and based on the block acknowledgment) that the audio packet has been successfully received, the transmitting device may stop sending repetitions of the audio packet (e.g., step 527). For example, the transmitting device may flush the audio packet from its corresponding queue based on the maximum number of retransmissions of the audio packet being reached or a successful reception of the audio packet. The flushed audio packet may no longer be available for construction of future aggregated signals.

After stopping the repetitions of the audio packet, the wireless device may determine (e.g., step 530) whether a second audio packet is available to be sent. The transmitting device may determine that a second audio packet is available to send, for example, if another audio packet (e.g., different from audio packets included in the aggregated signal) is available for transmission in a buffer of the transmitting device. If another audio packet is available for transmission in a buffer of the transmitting device, the second audio packet may be the another audio packet present in the buffer.

The transmitting device may determine that a second audio packet is available to send, for example, if the block acknowledgment indicates failed reception of one or more other audio packets in the aggregated signal and/or if respective maximum numbers of retransmissions for the one or more other audio packets has not been reached. If the block acknowledgment indicates failed reception of one or more other audio packets in the aggregated signal and/or if respective maximum number of retransmissions for the one or more other audio packets has not been reached, the second audio packet may be one of the one or more other audio packets.

In an example, where another audio packet (e.g., different from audio packets included in the aggregated signal) is available for transmission in a buffer and where the block acknowledgment indicates failed reception of one or more other audio packets in the aggregated signal, the transmitting device may preferentially select one of the one or more other audio packets as the second audio packet. In an example, where another audio packet (e.g., different from audio packets included in the aggregated signal) is available for transmission in a buffer and where the block acknowledgment indicates failed reception of one or more other audio packets in the aggregated signal, the transmitting device may preferentially select the another audio packet as the second audio packet based on the another audio packet having a higher priority (e.g., higher packet class) than the one or more other audio packets.

If the second audio packet is available to send, the transmitting device may send the second audio packet (e.g., step 535). The transmitting device may send the second audio packet via a second subframe (e.g., following the first subframe). The transmitting device may send the second audio packet via the second subframe, for example, in a second aggregated signal. The transmitting device may construct the second aggregated signal in a manner as described with respect to step 505. For example, the transmitting device may select packets, with the highest priorities from the different queues, for transmission in the second aggregated signal.

The transmitting device may send, in accordance with a frequency hopping scheme, the second aggregated signal via a different frequency channel than a frequency channel used for transmission of the aggregated signal. Additionally, or alternatively, the transmitting device may send the second audio packet via the first subframe (e.g., in a second aggregated signal). The second aggregated signal may or may not comprise other audio packets that were not included in the aggregated signal (e.g., as sent at step 505). If a second audio packet is not available to send (e.g., no additional packets in buffer, packets successfully received at the receiving device, and/or maximum repetitions reached for packets with failed transmissions), the method 500 may be terminated (e.g., until a next packet for transmission is received and/or detected in the buffer).

The transmitting device may repeat one or more of the steps 510, 515, 525, 527, 530, and 540 following the sending of the second aggregated signal comprising the second audio packet. For example, at step 530, following the sending of the second audio packet, the transmitting device may determine whether another (e.g., a third) audio packet is available to send.

If the transmitting device determines (e.g., at step 525) that the maximum number of retransmissions for the audio packet has not been reached, the transmitting device may send (e.g., step 540) a repetition of the audio packet. The transmitting device may send the repetition of the audio packet via a second subframe (e.g., following the first subframe). The transmitting device may send the repetition of the audio packet via the second subframe, for example, in a third aggregated signal. The transmitting device may send, in accordance with a frequency hopping scheme, the third aggregated signal via a different frequency channel than a frequency channel used for transmission of the aggregated signal. Additionally, or alternatively, the transmitting device may send the repetition of the audio packet via the first subframe. The third aggregated signal may or may not comprise other audio packets that were not included in the aggregated signal (e.g., as sent at step 505). The transmitting device may repeat one or more of the steps 510, 515, 525, 527, 530, and 540 following the sending of the third aggregated signal comprising the repetition of the audio packet. The transmitting device may perform the method 500 for each audio packet in the plurality of audio packets comprising the aggregated signal.

In an example, packets that have not been successfully received in a subframe may be superseded, in a next subframe, by higher priority packet(s) from the packet queues. For example, a block acknowledgment may indicate failed reception of a packet in an aggregated signal. A number of retransmissions for the packet may be less than the maximum number of retransmissions for the packet. If the packet queues comprise packets with higher priorities than the failed packet, the transmitting device may prioritize, for constructing the next aggregated signal, inclusion of the packets with higher priorities (e.g., over the failed packet). The transmitting device may prioritize, for constructing the next aggregated signal, inclusion of the packets with higher priorities even though the number of retransmissions for the failed packet may be less than the maximum number of retransmissions for the failed packet.

Figure 6:
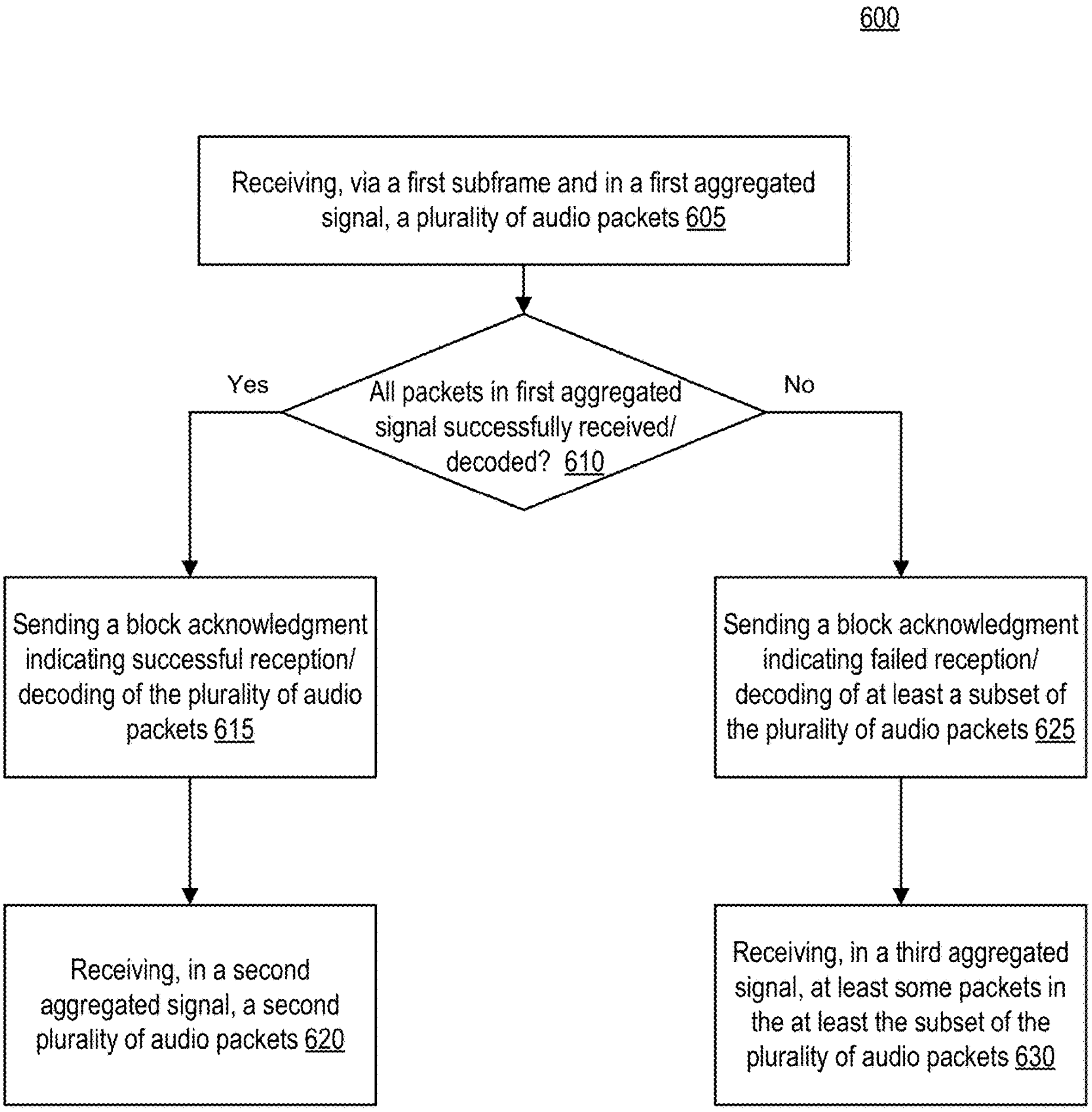
FIG. 6 shows an example method of receiving aggregated signals.

FIG. 6 shows an example method 600 for receiving aggregated signals. The example method 600 may be performed by one or more audio devices 105, the wireless hub 115, and/or the user device 120. While the example method 600 is described with reference to receiving audio packets, in other examples, the method 600 may be used for receiving control packets, data packets and control packets, and/or any other type of data.

At step 605, a receiving device (e.g., an audio device 105, the wireless hub 115, a user device 120) may receive, via a first subframe and in a first aggregated signal, a plurality of audio packets. At step 610, the receiving device may determine whether all audio packets in the plurality of audio packets have been successfully received and decoded. Determining whether audio packets have been successfully decoded may comprise performing CRC on the audio packets.

If the receiving device determines that all of the plurality of audio packets in the first aggregated signal have been successfully received/decoded, the receiving device may send (e.g., step 615) a block acknowledgment indicating successful reception/decoding of all of the plurality of audio packets. At step 620, the receiving device may receive, in a second aggregated signal, a second plurality of audio packets. Each of the audio packets in the second plurality of audio packets may be different from audio packets included in the first plurality of audio packets. The second aggregated signal may be received via the first subframe. The second aggregated signal may be received via a second subframe (e.g., following the first subframe). The receiving device may receive, in accordance with a frequency hopping scheme, the second aggregated signal via a different frequency channel than a frequency channel used for reception of the first aggregated signal.

If the receiving device determines that at least a subset of the plurality of audio packets in the first aggregated signal have not been successfully received/decoded, the receiving device may send (e.g., step 625) a block acknowledgment indicating failed reception/decoding of the at least the subset of the plurality of audio packets. At step 630, the receiving device may receive, in a third aggregated signal, a repetition of at least some audio packets in the at least the subset of the plurality of audio packets. The third aggregated signal may be received via the first subframe. The third aggregated signal may be received via a second subframe (e.g., following the first subframe). The receiving device may receive, in accordance with a frequency hopping scheme, the third aggregated signal via a different frequency channel than a frequency channel used for reception of the first aggregated signal.

The third aggregated signal may not comprise audio packets that were successfully received in the first aggregated signal, and subsequently were acknowledged via the block acknowledgment. The third aggregated signal may not comprise audio packets for which respective maximum retransmission limits have been reached. The third aggregated signal may or may not comprise other audio packets that were not included in the first aggregated signal (e.g., as received at step 605).

A device (e.g., an audio device, a wireless hub, a user device, etc.) may perform a method comprising multiple operations. The device may send, in a first aggregated signal and via a first frequency channel, at least a first packet and a second packet. The device may receive a block acknowledgment indicating successful reception of the first packet and unsuccessful reception of the second packet. The device may, based on the block acknowledgment indicating unsuccessful reception of the second packet, send, in a second aggregated signal and via a second frequency channel, a repetition of the second packet. The sending the repetition of the second packet may comprise sending one or more of repetitions of the second packet in one or more aggregated signals. A quantity of the one or more repetitions of the second packet may be based on a packet class associated with the second packet. The sending the one or more repetitions of the second packet may comprise sending the one or more repetitions of the second packet until a block acknowledgment indicating successful reception of the second packet is received. The second aggregated signal may not comprise (e.g., may exclude), based on the block acknowledgment indicating successful reception of the first packet, a repetition of the first packet. The second aggregated signal may not comprise any packets that were not included in the first aggregated signal. The device may send the first aggregated signal via a first subframe, and send the second aggregated signal via a second subframe different from the first subframe. The first subframe may further comprise a plurality of aggregated signals. The device may send, to a respective receiving device, a respective aggregated signal of the plurality of aggregated signals. The device may determine, based on a frequency hopping pattern, the first frequency channel and the second frequency channel. The first packet or the second packet may comprise at least one of: an audio packet or a control packet. The device may comprise one or more processors; and memory storing instructions that, when executed by the one or more processors, cause the device to perform the described method, additional operations and/or include the additional elements. A system may comprise a wireless hub configured to perform the described method, additional operations and/or include the additional elements; and another device configured to send the block acknowledgement. A computer-readable medium may store instructions that, when executed, cause performance of the described method, additional operations and/or include the additional elements.

A device (e.g., an audio device, a wireless hub, a user device, etc.) may perform a method comprising multiple operations. The device may send, in a first aggregated signal, at least a first packet and a second packet. The device may receive a block acknowledgment indicating successful reception of the first packet and unsuccessful reception of the second packet. Based on the block acknowledgment indicating unsuccessful reception of the second packet and based on a quantity of repetitions of the second packet being less than a threshold, the device may send, in one or more second aggregated signals, one or more repetitions of the second packet. Based on the block acknowledgment indicating successful reception of the first packet, the device may exclude, from the one or more second aggregated signals, repetitions of the first packet. The device may send, using a frequency hopping protocol, the first aggregated signal and the one or more second aggregated signals. The threshold may be based on a packet class associated with the second packet. The device may, based on the quantity of repetitions of the second packet being equal to the threshold, cease sending further repetitions of the second packet. The device may, based on a receiving a second block acknowledgment indicating successful reception of the second packet, cease sending further repetitions of the second packet. The one or more second aggregated signals may or may not comprise any packets that were not included in the first aggregated signal. The device may send the first aggregated signal via a first subframe. The device may send the one or more second aggregated signals, via one or more second subframes different from the first subframe. The first subframe may comprise a plurality of aggregated signals. The device may send, to a respective receiving device, a respective aggregated signal of the plurality of aggregated signals. The first packet or the second packet may comprise at least one of: audio packets or control packets. The device may send the first aggregated signal or the one or more second aggregated signals based on one or more of: a Bluetooth protocol, a Zigbee protocol, an Institution of Electrical and Electronics Engineers (IEEE) 802.11 Wi-Fi protocol, or a $3^{rd}$ Generation Partnership Project (3GPP) cellular protocol. The device may send the first aggregated signal or the one or more second aggregated signals via one or more of an industrial, scientific, and medical (ISM) band, a very high frequency (VHF) band, or an ultra-high frequency (UHF) band. ISM bands may comprise one or more of: a 2.4 GHz-2.5 GHz band, a 5.75 GHz-5.875 GHz band, a 24 GHz-24.25 GHz band, or a 61 GHz-61.5 GHz band. The device may comprise one or more processors; and memory storing instructions that, when executed by the one or more processors, cause the device to perform the described method, additional operations and/or include the additional elements. A system may comprise a wireless hub configured to perform the described method, additional operations and/or include the additional elements; and another device configured to send the block acknowledgement. A computer-readable medium may store instructions that, when executed, cause performance of the described method, additional operations and/or include the additional elements.

A device (e.g., an audio device, a wireless hub, a user device, etc.) may perform a method comprising multiple operations. The device may receive, in a first aggregated signal, at least a first packet and a second packet. The device may send a block acknowledgment indicating successful reception of the first packet and unsuccessful reception of the second packet. The device may receive, in one or more second aggregated signals, one or more repetitions of the second packet. The one or more second aggregated signals may not comprise repetitions of the first packet. The receiving the first aggregated signal and the one or more second aggregated signals may be based on a frequency hopping protocol. A quantity of the one or more repetitions may be based on a packet class associated with the second packet. The device may send a second block acknowledgment indicating successful reception of the second packet. The one or more second aggregated signals may or may not comprise packets that were not included in the first aggregated signal. The device may receive the first aggregated signal via a first subframe. The device may receive the one or more second aggregated signals via one or more second subframes different from the first subframe. The first subframe may comprise a plurality of aggregated signals from a plurality of devices. The first packet or the second packet may comprise at least one of: an audio packets or a control packet. The device may receive the first aggregated signal or the one or more second aggregated signals based on one or more of: a Bluetooth protocol, a Zigbee protocol, an Institution of Electrical and Electronics Engineers (IEEE) 802.11 Wi-Fi protocol, or a $3^{rd}$ Generation Partnership Project (3GPP) cellular protocol. The device may receive the first aggregated signal or the one or more second aggregated signals via one or more of an industrial, scientific, and medical (ISM) band, a very high frequency (VHF) band, or an ultra-high frequency (UHF) band. ISM bands may comprise one or more of: a 2.4 GHz-2.5 GHz band, a 5.75 GHz-5.875 GHz band, a 24 GHz-24.25 GHz band, or a 61 GHz-61.5 GHz band. The device may comprise one or more processors; and memory storing instructions that, when executed by the one or more processors, cause the device to perform the described method, additional operations and/or include the additional elements. A system may comprise a wireless hub configured to perform the described method, additional operations and/or include the additional elements; and another device configured to send the block acknowledgement. A computer-readable medium may store instructions that, when executed, cause performance of the described method, additional operations and/or include the additional elements.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

The invention claimed is:

1. A method comprising:

sending, in a first aggregated signal and via a first frequency channel, at least a first packet and a second packet;

receiving a block acknowledgment indicating successful reception of the first packet and unsuccessful reception of the second packet; and based on the block acknowledgment indicating unsuccessful reception of the second packet, sending, in a second aggregated signal and via a second frequency channel, one or more new audio packets and a repetition of the second packet.

2. The method of claim 1, wherein the sending the repetition of the second packet comprises sending one or more repetitions of the second packet in one or more aggregated signals.

3. The method of claim 2, wherein a quantity of the one or more repetitions of the second packet is based on a packet class associated with the second packet.

4. The method of claim 2, wherein the sending the one or more repetitions of the second packet comprises sending the one or more repetitions of the second packet until a block acknowledgment indicating successful reception of the second packet is received.

5. The method of claim 1, wherein the second aggregated signal excludes, based on the block acknowledgment indicating successful reception of the first packet, a repetition of the first packet.

6. The method of claim 1, wherein the first frequency channel and the second frequency channel are based on a frequency hopping pattern.

7. The method of claim 1, wherein the first packet or the second packet comprise at least one of: an audio packet or a control packet.

8. The method of claim 1, wherein sending the second aggregated signal comprising one or more new audio packets comprises maintaining a same quantity of audio packets in the second aggregated signal as in the first aggregated signal.

9. A method comprising:

sending, in a first aggregated signal, at least a first packet and a second packet;

receiving a block acknowledgment indicating successful reception of the first packet and unsuccessful reception of the second packet; and based on the block acknowledgment indicating unsuccessful reception of the second packet and based on a quantity of repetitions of the second packet being less than a threshold, sending, in one or more second aggregated signals, one or more new audio packets and one or more repetitions of the second packet;

wherein, based on the block acknowledgment indicating successful reception of the first packet, the one or more second aggregated signals exclude repetitions of the first packet.

10. The method of claim 9, further comprising:

sending, using a frequency hopping protocol, the first aggregated signal and the one or more second aggregated signals.

11. The method of claim 9, wherein the threshold is based on a packet class associated with the second packet.

12. The method of claim 9, further comprising:

ceasing sending repetitions of the second packet based on at least one of:

the quantity of repetitions of the second packet being equal to the threshold; or receiving a second block acknowledgment indicating successful reception of the second packet.

13. The method of claim 9, further comprising:

sending the first aggregated signal via a first subframe; and sending the one or more second aggregated signals via one or more second subframes different from the first subframe.

14. The method of claim 13, wherein the first subframe comprises a plurality of aggregated signals, wherein the method further comprises:

sending, to a respective device, a respective aggregated signal of the plurality of aggregated signals.

15. The method of claim 9, further comprising: sending the first aggregated signal or the one or more second aggregated signals via one or more of an industrial, scientific, and medical (ISM) band, a very high frequency (VHF) band, or an ultra-high frequency (UHF) band.

16. A method comprising:

receiving, in a first aggregated signal, at least a first packet and a second packet;

sending a block acknowledgment indicating successful reception of the first packet and unsuccessful reception of the second packet; and receiving, in one or more second aggregated signals, one or more new audio packets and one or more repetitions of the second packet, wherein the one or more second aggregated signals do not comprise repetitions of the first packet.

17. The method of claim 16, further comprising receiving, based on a frequency hopping protocol, the first aggregated signal and the one or more second aggregated signals.

18. The method of claim 16, wherein a quantity of the one or more repetitions is based on a packet class associated with the second packet.

19. The method of claim 16, further comprising:

receiving the first aggregated signal via a first subframe; and receiving the one or more second aggregated signals via one or more second subframes different from the first subframe.

20. The method of claim 19, wherein the first subframe comprises a plurality of aggregated signals from a plurality of devices.

21. The method of claim 16, further comprising: receiving the first aggregated signal or the one or more second aggregated signals via one or more of an industrial, scientific, and medical (ISM) band, a very high frequency (VHF) band, or an ultra-high frequency (UHF) band.

* * * * *